United States Patent [19]
Irwin et al.

[11] Patent Number: 4,617,166
[45] Date of Patent: Oct. 14, 1986

[54] METHOD FOR BLOW MOLDING ARTICLES WITH DEEPLY RECESSED EDGES

[75] Inventors: Christopher Irwin, Adrian; Richard M. Bowen, Addison, both of Mich.

[73] Assignee: Hoover Universal, Inc., Ann Arbor, Mich.

[21] Appl. No.: 769,540

[22] Filed: Aug. 26, 1985

[51] Int. Cl.$^4$ .................. B29C 49/04; B29C 49/56
[52] U.S. Cl. .................................. 264/531; 425/532; 425/541
[58] Field of Search ............... 264/529, 531, 534, 524; 425/532, 541

[56] References Cited

U.S. PATENT DOCUMENTS

| | | | |
|---|---|---|---|
| 3,672,799 | 6/1972 | Liebertz et al. | 264/529 X |
| 3,860,683 | 1/1975 | Ward | 264/531 |
| 4,265,102 | 5/1981 | Shimakata et al. | 264/534 X |
| 4,333,905 | 6/1982 | Hestehave et al. | 264/531 X |

FOREIGN PATENT DOCUMENTS 1454916  5/1969  Fed. Rep. of Germany ...... 425/532

Primary Examiner—Jan Silbaugh
Attorney, Agent, or Firm—Stephenson and Boller

[57] ABSTRACT

A method and apparatus for blow molding articles with deeply recessed edges utilizing mold halves each of which consists of a center section and end sections that are relatively movable in a direction lengthwise of the mold to enable both lengthening and shortening of the mold. Rack and pinion assemblies are associated with the mold sections so that in response to movement of one end section toward or away from the center section, the other end section is similarly moved toward or away from the center section to thereby enable selective lengthwise lengthening or shortening of the mold halves. This enables the mold halves to be shortened after they are closed on a parison to thereby compress the shape of the parison within the mold to thereby move portions of the parison closer to the edges of the mold cavity. This facilitates a uniform distribution of plastic material along the surface of the mold cavity when the parison is blown into conformity with the mold cavity.

2 Claims, 7 Drawing Figures

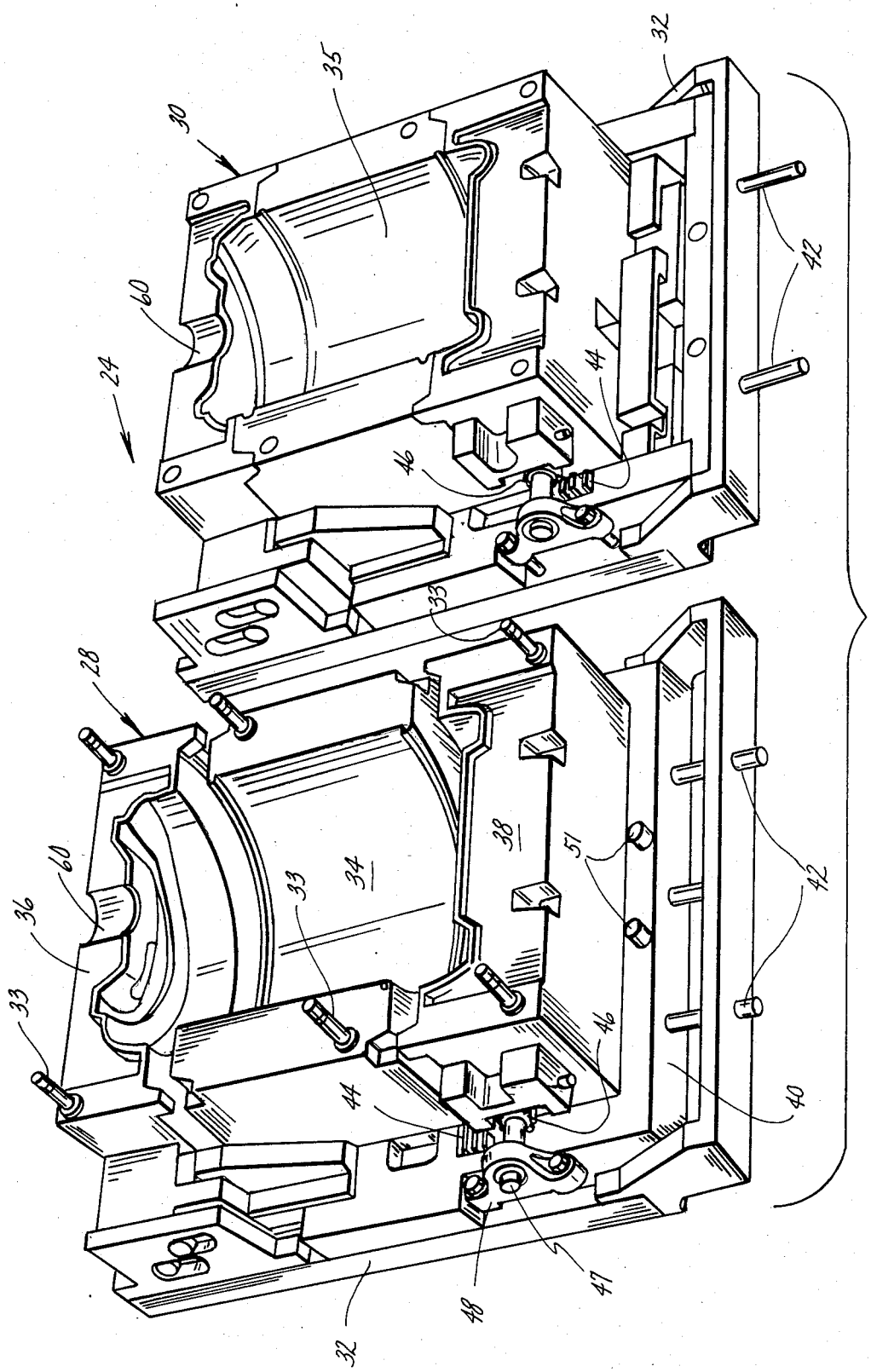

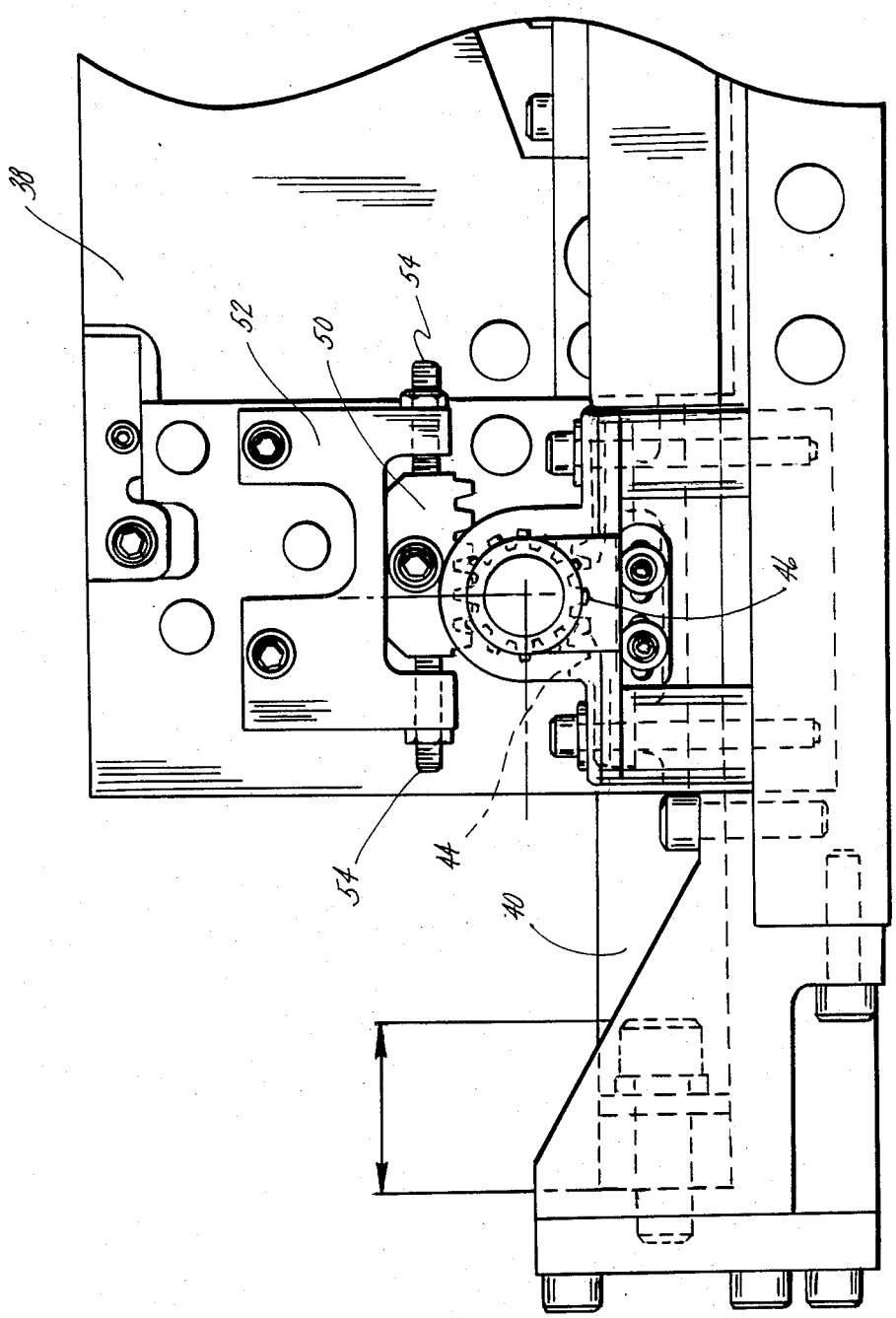

METHOD FOR BLOW MOLDING ARTICLES WITH DEEPLY RECESSED EDGES

BACKGROUND OF THE INVENTION

This invention relates generally to the field of blow molding and more particularly to an improved method and apparatus for blow molding articles with deeply recessed edges.

Conventional blow molding apparatus includes an extrusion head for producing an downwardly extending tubular parison and mold halves that are disposed on opposite sides of the parison in the open position of the mold. The mold halves are closed on the parison so as to pinch the lower edge of the parison closed and a blow pin assembly is usually inserted in the upper end of the mold to form the upper end of the parison into the neck and blow the parison into conformity with the mold cavity.

If the article being formed has one or more deeply recessed edges at either its top or bottom ends, and the parison is of the conventional shape at the time blow air is introduced, there is little likelihood that enough plastic will be extended into the recessed edge to form the edge of the desired strength and thickness. It is an object of the present invention, therefore, to provide an improved method and apparatus wherein the parison is closer to the recessed edge or edges before the parison is expanded into conformity with the mold cavity.

In a search of the prior art, U.S. Pat. Nos. 3,050,773, 4,092,392, 4,170,623 were found disclosing sectionalized mold halves, principally for the purpose of forming side wall extensions on containers. An article in *Plastics Engineering*, October 1982, page 21, discloses the concept of splitting a mold to control wall thickness. However, none of these references disclose the method and apparatus of this invention.

SUMMARY OF THE INVENTION

The improved method and apparatus of this invention utilizes mold halves each of which comprises center and end sections that are relatively movable in a direction axially of the parison to both lengthen and shorten the mold. More specifically, each of the mold halves comprises a support frame, a center mold section mounted in a fixed position on the frame, and a pair of end sections slidably mounted on the frame at opposite ends of the center section for movement toward and away from the center section. Rack and pinion assemblies on the frame are operatively associated with the end sections so that in response to movement of one of the end sections toward or away from the center section, the other end section is similarly moved toward or away from the center section to thereby enable selective lengthwise extension or retraction of the mold halves.

In the method of this invention, the mold halves are closed on the parison so as to pinch the lower end closed and grip the upper end of the parison while the mold halves are in their extended position so that a fairly long parison is gripped between the mold halves. The top and bottom end sections of the mold halves are then moved toward the center section so as to compress the parison and shorten the vertical height thereof. This action transforms the parison from its initial tubular shape into a more "pillow" shape, a shape resembling the shape of a "chiclet" chewing gum. This new parison shape positions parts of the parison near the corners or edges of the mold cavity, so that recesses can be located at one or all of the edges with the assurance that when the parison is blown into conformity with the mold cavity, there will be an adequate supply of plastic to fill the recessed edge or edges.

After the parison has been blown into conformity with the mold cavity, the mold halves are reversely actuated to move the end sections away from the center section following which the molds are moved apart into a clearance relation with the blown container which is removed from the mold.

The result is a blow molded product with a uniform wall thickness and adequate plastic in the recessed corner or corners.

Further objects, features and advantages of the invention will become apparent from a consideration of the following description and the appended claims when taken in connection with the accompanying drawing in which:

FIG. 6 is a perspective view of a typical mold apparatus for this invention, one mold half being shown in extended position and the other mold half being shown in its retractd position; and FIG. 7 is an enlarged fragmentary side elevational view of a portion of the mold apparatus.

Figure 1:
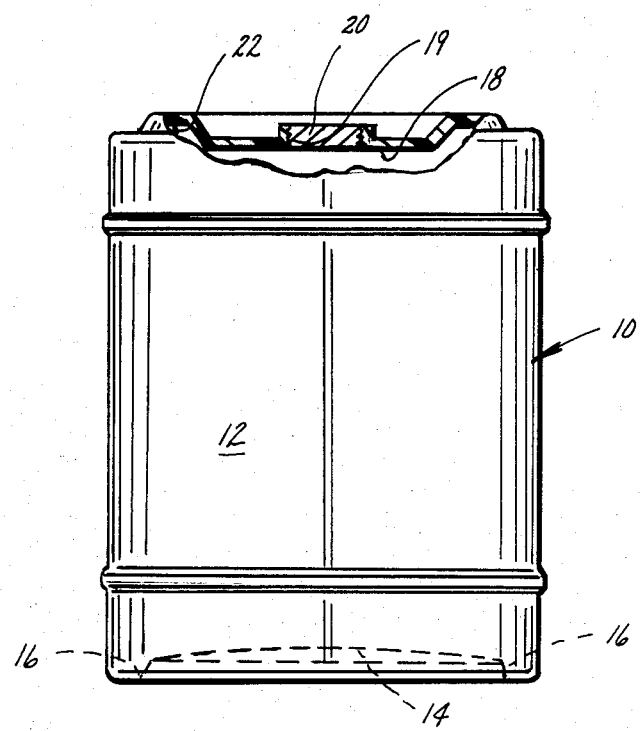
FIG. 1 is a side elevational view of a plastic container of the type that can readily be formed utilizing the method and apparatus of this invention; with part broken away for the purpose of clarity.
Figure 2:
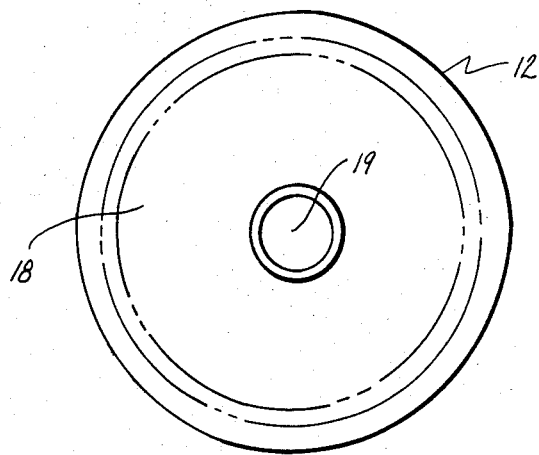
FIG. 2 is a top view of the container shown in FIG. 1.

With reference to the drawing, the improved method and apparatus of this invention is illustrated for forming a container 10 (FIG. 1) having an upright cyclindrical side wall 12 a bottom wall 14, with a deeply recessed edge 16, and a top wall 18 with a fill opening 19 closed by a cap 20. The top wall 18 also has a deeply recessed edge 22.

Figure 4:
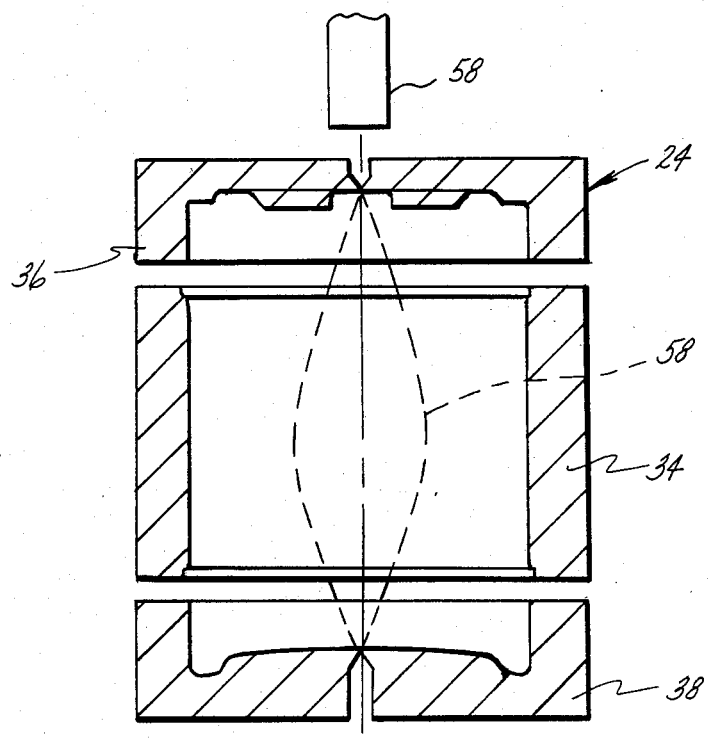
FIG. 4 is a diagrammatic elevational view of the mold apparatus of this invention in its extended position and closed on a parison.
Figure 5:
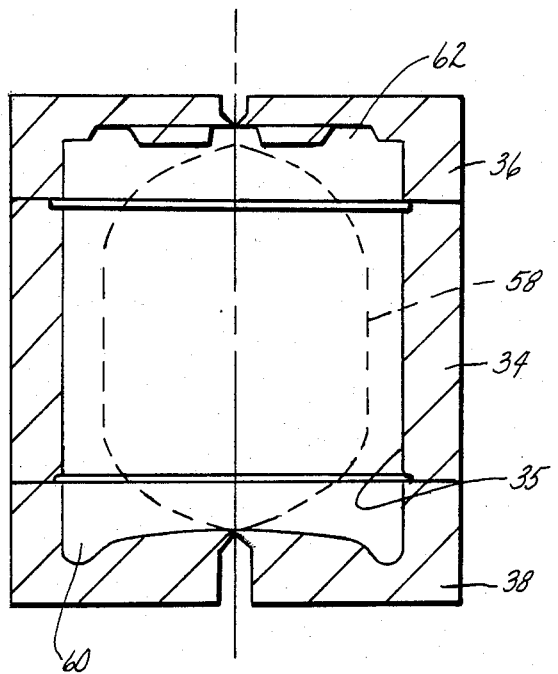
FIG. 5 is a view like FIG. 4 showing the mold in the shortened compressed position and illustrating the resultant position of the parison in broken line.

The mold apparatus of this invention, indicated generally at 24 in FIGS. 4, 5 and 6, consists of mold halves 28 and 30 which are substantially identical, the mold half 28 being illustrated in FIG. 6 in its extended position and the mold half 30 being shown in its retracted or compressed position. Since the mold halves 28 and 30 are substantially identical, only the mold half 28 will be described in detail, with like numerals indicating like parts on the mold halves 28 and 30. The mold half 28 includes a main frame 32 on which a mold center section 34 is mounted in a fixed position. The mold half 28 also includes a top end section 36 which is slidably mounted on the main frame 32 and a bottom end section 38 which is likewise slidably mounted on the frame 32.

The mold sections 34—34, 36—36, and 38—38 in the halves 28 and 30 are connected by pins 33 so that the end sections 36 and 38 move together and so that all sections 34, 36 and 38 cooperate to form a mold cavity 35, in the retracted condition of the mold 24, which corresponds to the desired shape of the container 10.

An actuating frame 40 is also slidably mounted on the main frame 32 and is connected to the top section 36.

actuating rods 42, conventionally driven by a fluid operated cylinder assembly (not shown) are operable to move the frame 40 between its upper position shown in connection with the mold half 28 and its lower position shown in connection with the mold half 30. The frame 40 carries a rack section 44 which is operable to drive a pinion 46 that is carried on shaft 47 rotatably mounted in a bearing block 48 secured to the frame 32. The pinion 46 also drives a rack section 50 that is adjustably mounted on a block 52 that carries adjustment screws 54 (FIG. 7). The block 52 is secured to the mold end section 38. The internal frame 40 is operable through the coaction of the pinion 46 and racks 44 and 50 to provide for concurrent movement of the mold end sections 36 and 38 toward and away from the center section 34, the screws 54 being adjustable to insure the desired tight engagement of the mold sections in the retracted condition of the mold 24.

The frames 40 on the mold halves 28 and 30 are connected by pins 51 so that they move in unison to directly move the mold top sections 36 and provide for pinion drive of the mold lower sections 38.

In the operated of the mold apparatus 24 in the method of this invention, assume that the apparatus includes a parison forming station at which a tubular parison 58 (FIG. 4) is formed and the mold halves 28 and 30 are closed on the parison 58 while the mold halves are in their extended positions shown in FIG. 4. In this position, the parison is aligned with the openings 60 in the mold halves 28 and 30 that correspond to the fill opening in the container 10.

The actuating rods 42 are then operated to shift the internal frame 40 to move the mold end sections 36 and 38 into engagement with opposite ends of center section 34, as illustrated in FIG. 5. This causes the parison 58 to be compressed to the pillow or chiclet shape and drape into positions closer to the corner sections 60 and 62 of the mold cavity 35 that correspond to the edge recesses 16 and 22 in the container 10. A conventional blow pin (now shown) is then rammed downwardly into the mold opening 60 so as to mold the neck of the container 10 and blow the parison 58 into conformity with the mold cavity 35.

As soon as the blowing step has been concluded, the actuating rods 42 are operated to move the internal frame 40 in a reverse direction to cause the mold end section 36 and 38 to separate from the center section 34 to that the top and bottom ends of the blown container 10 can be disengaged from the cavity corner sections 60 and 62 in the mold 24.

Figure 3:
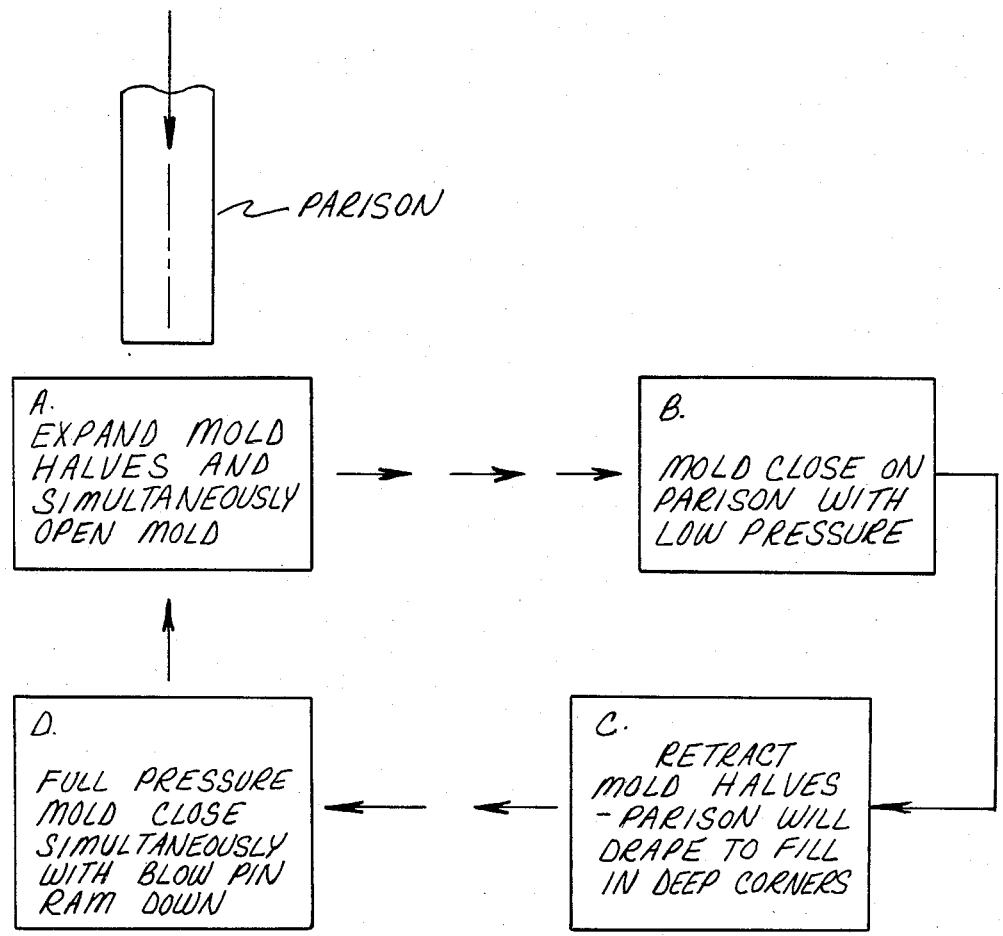
FIG. 3 is a block diagram illustrating the process of this invention.

The completed container 10 is then removed from the mold 24. The above described cycle, shown diagrammatically in FIG. 3, is then repeated to produce a second container 10.

From the above description, it is seen that this invention provides an improved method and apparatus for forming particularly shaped containers like the one indicated at 10 in FIG. 1 that have deeply recessed edges 16 and 22 at the ends.

What is claimed is:

1. The method for blow molding a hollow article having at least one recessed edge at the top or bottom ends thereof in a mold that can be opened and closed comprising the steps of:
    a. extruding a vertically extending hollow parison,
    b. first closing a mold on said parison so as to pinch the lower end closed and grip the upper end of the parison,
    c. next moving the top and bottom ends of the mold toward each other so as to compress the parison and shorten the vertical height thereof and thereby position parts of the parison near the portion of the mold defining the at least one recessed edge,
    d. then expanding the parison into conformity with the mold cavity including said mold portion defining said at least one recessed edge so as to form said hollow article,
    e. then moving said top and bottom mold ends away from each other into clearance relation with the article, and
    f. finally opening the molds.

2. The method for blow molding a hollow article having at least one recessed edge at the top or bottom ends thereof in a mold that can be opened and closed comprising the steps of:
    a. extruding a vertically extending hollow parison,
    b. providing said mold with relatively movable sections enabling vertical adjustment of the height of the mold,
    c. first closing the mold on said parison so as to pinch the lower end closed and grip the upper end of the parison, with the mold in a vertically extended condition,
    d. next moving the mold sections toward each other so as to shorten the vertical height of the mold and compress the parison within the mold and thereby position parts of the parison near the portion of the mold defining the at least one recessed edge,
    e. then expanding the parison into conformity with the mold cavity including said mold portion defining said at least one recessed edge so as to form said hollow article,
    f. next moving said mold section away from each other into clearance relation with the article, and
    g. finally opening the molds to enable removal of the article.

* * * * *